April 22, 1952  H. G. STRONG  2,593,628
QUOTIENT OR PRODUCT METERING
AND REGISTERING INSTRUMENT
Filed March 10, 1947  3 Sheets-Sheet 1
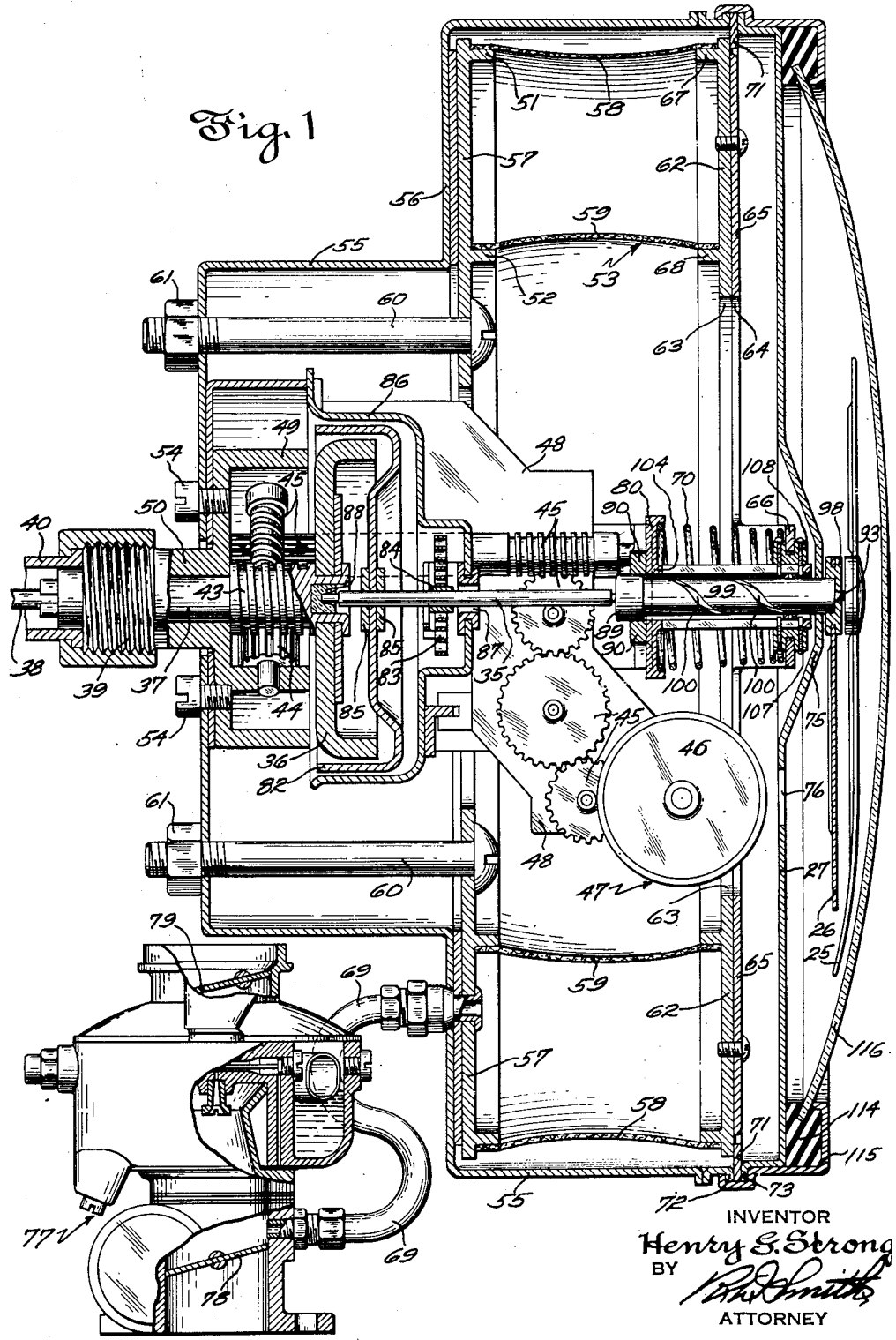
INVENTOR
Henry G. Strong
BY
ATTORNEY April 22, 1952
H. G. STRONG
2,593,628
QUOTIENT OR PRODUCT METERING
AND REGISTERING INSTRUMENT
Filed March 10, 1947
3 Sheets-Sheet 2
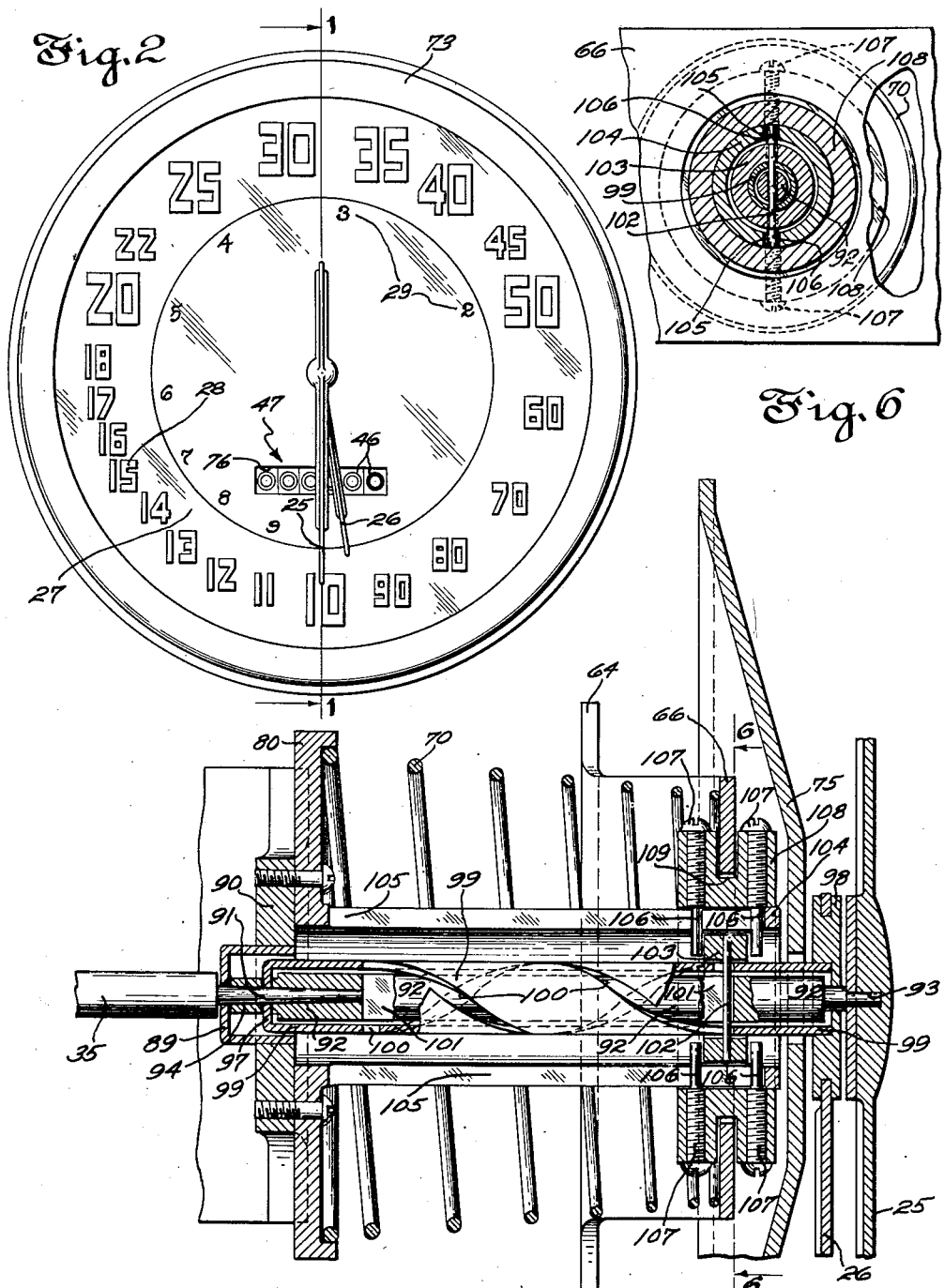
INVENTOR
Henry G. Strong
BY
ATTORNEY April 22, 1952

H. G. STRONG 2,593,628

QUOTIENT OR PRODUCT METERING
AND REGISTERING INSTRUMENT

Filed March 10, 1947

INVENTOR
Henry G. Strong
BY
ATTORNEY

Patented Apr. 22, 1952

2,593,628

UNITED STATES PATENT OFFICE 2,593,628

QUOTIENT OR PRODUCT METERING AND REGISTERING INSTRUMENT

Henry G. Strong, Fayetteville, N. Y.

Application March 10, 1947, Serial No. 733,539

16 Claims. (Cl. 235—61)

This invention relates to ratio registering instruments and to methods which may be put into practice with or without the use thereof whereby plural readings may be observed on a common scale of numerical indicia, one reading denoting the currently existing value of an arbitrarily changing dividend measurement or of a measurable factor while the other reading denotes the simultaneously existing value of a quotient which is a function of such dividend measurement of a measurable factor or denotes the simultaneously existing value of a product which is a function of said factor. Particularly the quotient may consist of the said dividend measurement or measurable factor divided by the concurrently existing value of some arbitrarily changing divisor measurement or measurable factor or the product may consist of the said factor multiplied by the concurrently existing value of some other arbitrarily changing factor.

Specifically according to the present improvements the single scale of indicia may be fixed and stationary in contrast to former proposals to use movable charts. As mentioned above, the novel feature of producing plural readings on a single scale of indicia may be utilized in operations of multiplication as well as division and in either case differs distinctly from former proposals wherein in order to obtain either a quotient reading or a product reading one scale of indicia has been movably adjusted in relation to another scale of indicia as in the familiar manner of working the two or more sets of logarithmic markings carried on the body member and on the slide bar respectively of a conventional computing slide rule.

One example of practical use in performing division or the registering of ratios in a measuring instrument, particularly of the composite type, is recognized in the advantages of being informed constantly as to the efficiency with which an internal combustion engine is operating at any given moment at whatever speed the engine may be running. For instance, it is desirable to present to the view of the driver of a motor vehicle, not only the usual speedometer reading that informs him of the number of miles per hour the vehicle is traveling, but to provide him at the same moment with a supplementary reading informing him of the existing rate at which liquid fuel is being consumed by the engine in terms of miles being traveled by the vehicle per gallon of fuel being consumed.

While means have been proposed heretofore for measuring and registering rates of fuel consumption in terms of gallons of fuel being taken into an engine per hour of engine operation, a reading of this kind alone fails to take into any account the existing speed of travel of the engine, or engine-driven vehicle. Hence such reading can not be informative of engine efficiency without resort to mental computations involving comparison of the gallons-per-hour reading of a fuel consumption gauge with the miles-per-hour reading of a speedometer. The present invention, however, makes possible a constantly and automatically effected direct reading on a single scale of numerical indicia not only of the speed at which a vehicle is traveling but simultaneously of the existing efficiency of operation of the engine in terms of miles being traveled by the vehicle per gallon of fuel being consumed.

In the foregoing example of one practical application the speedometer reading may be regarded as one form of a dividend measurement while the rate of fuel consumption per hour reading may be regarded as one form of a divisor measurement, wherefore the above said engine efficiency reading actually comprises the instantaneous quotient of such dividend measurement dividend by such divisor measurement.

While this understanding of the more general nature of the invention one object thereof is to register both the above mentioned dividend measurement (miles per hour) and the above said quotient (miles per gallon) on a common, and preferably stationary, single scale of indicia.

A further object is to accomplish both of these registrations automatically and constantly.

Another object is to integrate automatically a dividend measurement (miles per hour) with a divisor measurement (gallons per hour) in a manner to arrive at and automatically register the resulting quotient (miles per gallon) along with the registration of such dividend measurement (miles per hour) by means of two indicators that are separately movable relatively to each other over the same scale of numerical indicia.

Another object is to construct and fashion such indicators as cooperative rotary pointers of such shape, size and disposition that one pointer covers and substantially conceals the other whenever both pointers register with an identical indicium of the said common scale of indicia.

The foregoing and related objects of the invention will appear in greater detail in connection with the following description of an illustrative embodiment of the invention having reference to the accompanying drawings, wherein:

Fig. 1 is a side view taken in section on the plane 1—1 in Fig. 2 showing on a larger scale than in Fig. 2 a composite ratio registering instrument incorporating the present invention and with associated apparatus.

Fig. 2 is a front view of the registering instrument alone, drawn on a scale reduced to a preferred actual size looking toward the left at the chart face and at the indicating pointers of Fig. 1.

Fig. 3 is an enlarged fragmentary view of parts of the integrating means of Fig. 1 which automatically computes a quotient value from dividend and divisor measurements.

Figure 4:
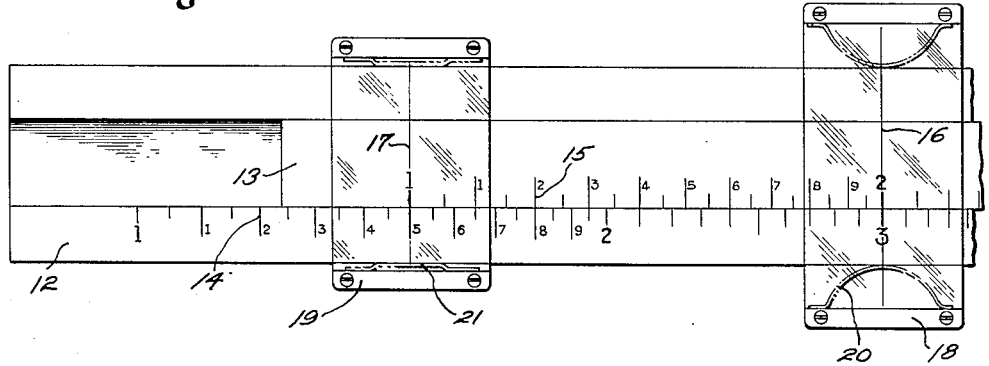

Fig. 4 diagrammatically represents a conventional form of computing slide rule modified to illustrate certain principles underlying the present invention.

Figure 5:
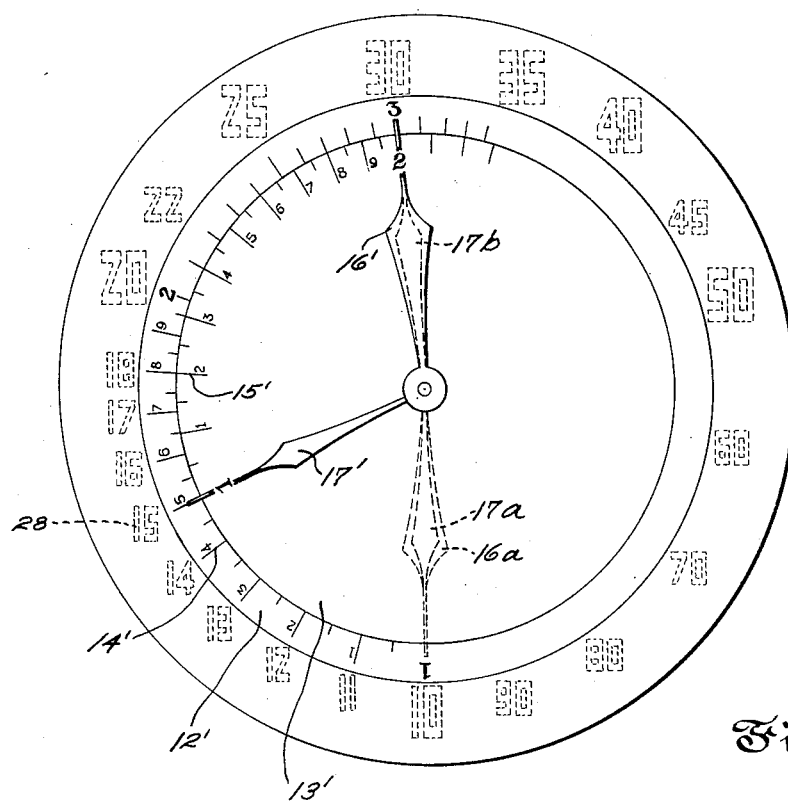

Fig. 5 shows markings added to the chart of Fig. 2 for explanative comparison with the slide rule of Fig. 4.

Fig. 6 is a fragmentary view taken in section on the planes 6—6 in Fig. 3 looking in the direction of the arrows and is drawn on a scale intermediate that of Figs. 1 and 3.

The invention will first be explained with reference to diagrammatic Figs. 4 and 5 after which there will be described with references to Figs. 1, 2 and 3 a practical operative embodiment by which the invention may be put in use to particular advantage in registering both the speed and efficiency of operation of internal combustion engines especially in motor vehicles.

Fig. 4 depicts in modified form the familiar structure of a conventional computing slide rule having the elongated channeled body 12 with its usual computing bar 13 freely slidable lengthwise thereof. The body 12 of the slide rule carries a scale of numerically labeled indicia 14 whose unequal spacings, in well understood manner, accord with logarithms which may be common logarithms to the base "10." The unequal spacings of the indicia of companion scale 15 marked on the computing bar 13 similarly accord with logarithms to the same base. Hence if the bar 13 were so positioned relatively to body 12 that the index indicia labeled "1" at the beginnings of both scales mutually register, then all others of the indicia of both scales would be respectively in mutual register.

In the working of an ordinary slide rule if it is desired to perform division of the antilogarithm "30" by the antilogarithm "2" then the indicium labeled "2" on the slidable logarithmic scale 15 will be placed in register with the indicium labeled "3" on the stationary, but otherwise similar, logarithmic scale 14 by manually sliding the computing bar 13 to its position shown in Fig. 4, whereupon the quotient of antilogarithm "30" divided by antilogarithm "2" will be directly readable as the antilogarithm "15" on scale 14, with which quotient indicium on scale 14 the index indicium, or first indicium labeled "1" on scale 15, is now observed to register. Mathematical division performed by graphic subtraction of a chosen portion of the logarithmic scale 15 from a chosen portion of the logarithmic scale 14 is an old and well understood art. If the antilogarithm "30" used in the foregoing example represents, say, a dividend measurement denoting 30 miles-per-hour rate of travel of a motor vehicle, and the said antilogarithm "2" represents a divisor measurement denoting 2 gallons-per-hour rate of fuel consumption, then our slide rule of Fig. 4 has been used to produce a direct reading of the quotient that results from dividing "30" miles-per-hour by "2" gallons-per-hour, this quotient being "15" miles-per-gallon. Such quotient at any particular moment truly denotes the efficiency of the motor in terms of how much distance the vehicle would traverse during the consumption of one gallon of fuel if the indicated motor efficiency were to remain constant.

In arriving at these readings by manipulation of a slide rule we have assumed a knowledge of the gallons-per-hour rate of fuel consumption, namely 2 gallons per hour. As a matter of fact such divisor factor stands clearly indicated in Fig. 4 of the drawings on logarithmic scale 15 by the registration of the customary hair line 16 on glass slide 18 with indicium "2" on scale 15. If we choose to compare this single hair line 16 to some single form of indicator in a measuring instrument, such as a rotary pointer, it will be seen that this single hair line could not be moved to register with and thus point out the quotient numeral "15" without destroying the ability of this hair line to continue its function of marking the dividend numeral "30." In other words, with only the usual one glass slide 18 on our slide rule of drawing Fig. 4 we can not discernably point out both the reading of "30" miles-per-hour and the reading, "15" miles per gallon. Conversely in multiplication if the single glass slide 18 were to be used to mark one factor numeral "15" on scale 14 it could not simultaneously be used to mark the other factor numeral "20" together with the product numeral "30."

I have devised a way of solving this shortcoming by adding to the usual glass slide 18 a separate and supplementary glass slide 19 carrying the supplementary indicative hair line 17. Glass slide 19 is so structurally related to glass slide 18 that hair line 17 may be moved to a position exactly beneath hair line 16 between the latter and the graduated surface of the slide rule. Glass slide 19 is free to be moved any desired distance in either direction away from glass slide 18, as for instance toward the left along the stationary scale of indicia 14. Hair line 16 can thus be left in register with the indicium of stationary scale 14 representing "30" miles-per-hour while supplementary hair line 17 can be moved backward or toward the left away from hair line 16 until it comes to register with the indicium on the same stationary scale 14 that represents "15" miles-per-gallon. If the process were multiplication hair line 16 might be left in register with the factor indicium "15" while hair line 17 is moved forward or toward the right away from hair line 16 into register with the product indicium "30."

Referring now to drawing Fig. 5, the present invention enables a composite automatic ratio measuring and registering instrument to accomplish plural readings simultaneously and automatically on a single stationary circular logarithmic scale 14' comparable with the stationary logarithmic scale 14 of Fig. 4. The reading indicators corresponding to slidable hair lines 16 and 17 are rotary pointers 16' and 17', respectively. The outer and larger pointer 16' covers, and if opaque may conceal, the inner and smaller pointer 17' whenever both pointers are in common register with any same indicium. Pointer 16' could if preferred be made of transparent material thereby to reveal pointer 16' in either of its positions 17a or 17b in Fig. 5. The starting and normally idle positions of both pointers are designated 16a and 17a, respectively, in Fig. 5.

By comparing the markings on scale 14' in Fig. 5 with corresponding markings on scale 14 in Fig. 4 it will be seen that the separated positions of pointers shown in full lines at 16' and 17' correspond respectively with the separated positions of hair lines 16 and 17 in Fig. 4. For furthering the comparison of the diagram of Fig. 5 with Fig. 4, the scale of dividend indicia 14' may be assumed to be marked on a ring form of frame structure 12' corresponding to slide rule frame 12 whereupon an internal disc 13' corresponding to computing bar 13 of Fig. 4 and bordered by structure 12' may be assumed to be freely rotatable in relation to circular frame 12' and carry the angularly equivalent scale of divisor indicia 15' corresponding to indicia 15 in Fig. 4.

Referring now to Figs. 1, 2, and 3 of the drawings, movement between a speedometer pointer 25 and an efficiency indicating pointer 26, related as are pointers 16' and 17' of Fig. 5 and both sweeping over a common logarithmic scale 28 on a stationary chart 27, can be occasioned by an integrating means incorporated in the aforementioned instrument, a possible form of this means being in part shown in enlarged detail in Fig. 3. The operative relationship of this integrating means to jointly working components of the composite instrument for independently measuring vehicle speed in miles-per-hour and rate of liquid fuel consumption in gallons-per-hour is illustrated in Fig. 1.

In the instrument of Fig. 1, 35 represents the spindle of a rotary speedometer pointer 25 (corresponding to pointer 16' of Fig. 5) which sweeps angularly over a circular scale of indicia 28 (corresponding to indicia 14' in Fig. 5) on a stationary chart 27 responsively to variations in the uni-directional rotary speed of a magnetic armature shell 36 in keeping with conventional speedometer practice. Armature shell 36 is driven at a speed constantly proportioned to that of the driving gear of an automotive vehicle by connections that are only scantily represented in Fig. 1 wherein a stub shaft 37 and its detachable flexible driving cable 38 are separably coupled together within the separable joint 39 of a cable housing conduit 40 thereby to rotate in unison. In addition to armature shell 36, shaft 37 carries fixed thereon a driving worm 43 which meshes with a gear 44 of a speed reduction train 45 which imparts rotary motion to number wheels 46 in the accumulative register 47 of a conventional mileage counter. The gear members of reduction train 45 have rotary support on a frame bracket 48 that is fixedly mounted on the gear housing 49 which includes a bearing 50 in which stub shaft 37 is journaled. Also fixed on gear housing 49 by screws 54 or otherwise, is the flat rear wall of an overall housing shell 55 which may be drawn from sheet metal and stepped down in diameter to provide the annular flat wall 56.

As a source of flow responsive movement for constantly measuring a changing rate of flow of the liquid fuel that is being delivered to the motor of the aforesaid vehicle there is stationed on the inner face of the flat housing wall 56 the rigid base plate 57 of a hollow ring-type of bellows 53 having non-stretchable cylindrically concentric collapsible walls 58 and 59 made of thin flexible sheet material or bellows cloth affording little or no resistance to wrinkling and rubberized or otherwise suitably treated to make it impervious to vapor. Base plate 57 is centrally apertured and is drawn tightly against the inner flat surface of housing wall 56 by tie bolts 60 and nuts 61. The rear edges of the flexible bellows walls 58 and 59 are attached by an adhesive or otherwise in hermetically sealed connection to concentric circular flanges 51 and 52, respectively, on the bellows base plate 57 while the opposite or front edges of the same bellows walls are similarly attached in hermetically sealed connection to concentric circular flanges 67 and 68, respectively, on an axially reciprocative stiff head plate 62. Head plate 62 is centrally apertured at 63 and carries fixed thereon in spanning relation to its aperture 63 an actuating spider 64 comprising a flat ring portion 65 attached to head plate 62 and an axially offset diametrically disposed propelling bridge 66 that serves to shift axially back and forth, toward left and right in Fig. 1, certain parts of the integrating means of Fig. 3 responsively to variations in the rate of intake of liquid fuel by the vehicle engine. Hereinafter it will appear that bridge 66 is guided in a straight path of movement by the integrating means such as will always centralize the bellows head 62 in housing 55.

A spring coil 70 has its rear or left end in Figs. 1 and 3 based against a bed flange 80 fixed on cross bar 90 of frame bracket 48 and constantly presses lightly on the bridge piece 66 of ring plate 65 in a direction normally to urge the bellows head plate 62 forward, or toward the right in Fig. 1, and against a circumferential rigid stop ledge 71. Stop ledge 71 comprises a narrow circular ring lodged fixedly between the outwardly lipped edge 72 of housing 55 and an outwardly lipped edge 73 of a stationary instrument chart or dial 27. Chart 27 has an apertured, forwardly dished, central region 75 located in front of and concealing the impelling bridge 66 of the bellows motivated spider 64. Chart 27 contains an elongated window opening 76 positioned to expose and make readable from the front of the instrument the bank of side-by-side mileage counting number wheels 46.

Movement of bellows head 62 backward and forward, or reciprocatively between right and left in Fig. 1, is caused by the action of spring 70 in cooperation with variations in sub-atmosphere pressures, or degrees of partial vacuum, in the annular bellows chamber enclosed by base plate 57, head plate 62 and the flexible bellows walls 58 and 59. Such variation of sub-atmospheric pressure within the bellows may be caused and determined in several ways. That illustrated here is to place the interior of the bellows in vapor communication with the Venturi region in the neck of a carburetor, as through a length of tubing 69 opening through the base plate 57 of the bellows and opening into the side wall of carburetor 77 at the air intake side of the lip of its butterfly throttle valve 78.

For automatically measuring the rotary speed of armature shell 36 which spins unidirectionally in accordance with the miles-per-hour speed at which a vehicle may be traveling, a speed senser 82 fixed on spindle 35 flanks and cups about the armature shell 36 in sufficient proximity thereto to be urged magnetically to turn various distances less than a full revolution in the direction armature shell 36 is rotating. Thus 82 may be regarded as part of a source of speed responsive motion. This urging of sensor 82 to turn is opposed by the yielding resistance of a spiral spring 83 whose inner end may be connected with a collar 84 fixed on the same spindle 35 which fixedly carries the speed senser 82. In order to offer varying torque resistances to successive respective increments of turning movement of spindle 35 which shall be in calibration with logarithmic values of the spacings of indicia 28 on dial 27, spring 83 may be shaped and bent as desired or collar 84 may be given a peripheral contour whose angularly progressive radii accord respectively with logarithmic functions of algebraic progressions whereupon the inner end of spring 83 may be connected to collar 84 by a very flexible band or thread (not shown) in a manner to cause the latter to wind about such collar as spindle 35 turns. The outer end of spring 83 is attached to a stationary protective housing 86 which is removably fixed on the gear housing 49. Housing 86 contains a central aperture 87 affording clearance for the spindle 35 which extends therethrough and has a rear end of reduced diameter pivoted antifrictionally in a bearing jewel 88 embedded in a socket in the front end of stub shaft 37. Further comprising instrumentalities impellingly associating speed senser 82 with the speed indicator 25, the reduced front end 91 of spindle 35 is journaled to turn freely in a cup bearing 89 lodged fixedly in a cross bar 90 that is rigid with frame bracket 43. The front extremity of spindle 35 is tapered and carries in rigid unison therewith the coaxially aligned spindle extension 92 whose reduced front end 93 carries fixed thereon the speedometer pointer 25.

The miles-per-hour indicating pointer 25 is coaxial with the hereinbefore mentioned miles-per-gallon or efficiency indicating pointer 26 which operates directly at the rear thereof. Pointer 26 is fixed on a hub 98 that has a free rotary fit on the reduced front end 93 of spindle extension 92.

Associated with hub 98 of pointer 26 there are slippage permitting devices for transmitting movement from the aforesaid instrumentalities to pointer 26 including an elongated hollow cylinder 99 fixed to hub 98 carrying double separate cam threads which wind about the cylinder 99 in form of slots 100 cut through the curved wall thereof. These screw-like cam threads have pitches which may vary at different points in the length of a single such thread but which are similar to each other at any given point in the axial length of the cylinder. The hollow interior of cylinder 99 is occupied by the spindle extension or stem 92. Cylinder 99 terminates in an end wall 97 which has a free turning fit on spindle end 91 and which derives thrust in one axial direction from the end of stem 92 and in the other axial direction derives thrust from a spacer collar 94 interposed between cup bearing 89 and cylinder end wall 97. Spindle extension 92 possesses an axially elongated channel, here shown to be straight although it might wind or twist along stem 92 instead, represented by the diametral slot 101 completely piercing the otherwise solid spindle extension 92 and terminating short of the extreme ends of the latter. A proper screw twist in slot 101 would enable slots 100 to be made straight and still produce the herein described motion integrating function of the cooperative slots.

Extending diametrically crosswise through both the single slot 101 and both cylinder slots 100 as part of means operably relating the aforesaid slippage permitting movement transmitting devices to the source of flow responsive movement there is a driver in the form of a stiff impelling pin 102 whose opposite ends are fixed in a shifter collar 103 that rings the hollow cylinder 99 and is free to perform both rotary movement and axially sliding movement relative thereto as permitted by the winding cam slots 100.

An annular space around cylinder 99 of sufficient size to accommodate freely the axial sliding movements of shifter collar 103 is contained within a stationary hollow frame post 104 which horizontally projects from and is rigid with the aforementioned bed flange 80 on which spring 70 is seated. Straight, axially elongated, diametrically opposite slots 105 are cut through the cylindrical walls of stationary frame post 104 in which slots there are respectively slidable two pairs of spaced yoke pins 106 which project into the aforesaid annular space about cylinder 99 to reach into impelling engagement with opposite sides of shifter collar 103. In the form shown, pins 106 may comprise the reduced ends of removable screws 107 which thread into a yoke ring 108 that is bored to encompass and have a free sliding fit in an axial direction on frame post 104. Yoke ring 108 is circumferentially grooved at 109 to be impellingly engaged by the aforementioned bridge portion 66 of the bellows carried, actuating spider 64. The steadying fit of yoke ring 108 in bridge 66 is made such as will prevent the round bellows head 62 from scraping against the encompassing cylindrical wall of housing 55.

To complete a protective enclosing structure for the instrument a peripheral rubber ring gasket 114 is held against the front face of the chart 27 by a circular channel piece 115. The edges of a transparent crystal or circular window glass 116 are embedded in the soft material of this gasket 114 which affords a shock absorptive mounting for same.

In one instance of practical use, the instrument of Fig. 1 may be mounted back of a sight aperture in the instrument board of an automobile, truck or bus (not shown) within view of the operator, while carburetor 77 will ordinarily be remote therefrom because close to the engine of the motor vehicle. Tubing 69 will be of sufficient length to span the distance between instrument and carburetor and usually extends through the dashboard that separates the engine compartment from the driver's compartment. The flexible drive shaft 38 operably connects at some usual point to the driving gear of the vehicle in a manner to be rotated unidirectionally at a speed constantly proportioned to the speed of the vehicle. Armature shell 36 will thereupon rotate at corresponding speeds and because of its inductive attraction for the speed senser 82, the latter and its spindle 35 will be urged to turn somewhat in the same rotary direction as shell 36 against the predetermined yielding resistance of spiral spring 83 thus deflecting pointers 25 and 26 clockwise from their idle positions, such as 16a and 17a in Fig. 5, to an angular extent that will cause both pointers to turn to positions 16' and 17b into register on scale 28 with the numeral "30" that indicates the number of miles per hour the vehicle is traveling. Under the circumstances assumed, pointer 26 will turn in unison with pointer 25 because cross pin 102 transmits the full degree of turning movement of stem 92 to cylinder 99.

The foregoing condition would prevail if the vehicle happens to be coasting at the aforesaid speed, as for instance when clutch is out and throttle 78 is closed so that the down draft carburetor 77 does not exert appreciable suction through tube 69 upon bellows 53. Under these circumstances no appreciable amount of gas is being drawn from the carburetor if the choke valve 79 is normally open and the bellows 53 therefore will remain undisturbed in its position shown in Fig. 1, it being yieldingly so established by the urge of spring 70 ultimately opposed by stop ledge 71.

Now should an opening of throttle valve 78 occur so that a rush of air downward through the carburetor creates a suction at the adjacent opening of tube 69, the resultant reduction in pressure within bellows 53 will leave the latter subjected to the constant ambient air pressure which will cause the bellows to collapse progressively in accordance with increase of the degree of vacuum within the bellows. This will draw the bellows head plate 62, and with it the propelling bridge 66, toward the left, from its position shown in Figs. 1 and 3, with the following mechanical effect upon the miles-per-gallon efficiency indicating pointer 26.

In moving toward the left, propelling bridge 66 carries with it yoke ring 108 whose yoke pins 106 shove the shifter collar 103 an equal distance toward the left in Fig. 3. But since shifter ring 103 carries with it the driving pin 102, the latter will cam along the winding slots 100 in cylinder 99 causing the latter to deflect counterclockwise in Fig. 6, or in a direction opposite to that in which the speedometer pointer 25 was moved by increase in rotary speed of speedometer armature 36. It thus becomes evident that progressively increasing dividend values, in the form of increases in vehicle speed automatically measured by responsive motion of the speedometer arising at senser 62, produce clockwise measuring deflection of the miles-per-hour indicating pointer 25 in Fig. 2, while progressively increasing divisor values, consisting of increases in the rate of flow of gasoline from carburetor 77 to the engine automatically measured by responsive movement of the flow meter arising in bellows 53, produce counterclockwise measuring movement of the quotient or gallons-per-hour indicating pointer 26 relative to pointer 25. This takes place similarly irrespective of what may chance to be the angular position of pointer 25 on stationary scale 28. Consequently pointer 25 at all times affords a direct reading of the number of miles per hour at which the vehicle is traveling while pointer 26 simultaneously affords a direct reading on the same stationary scale 28 of the number of miles of vehicle travel per gallon of fuel being consumed by the engine while driving the vehicle at the latter's indicated speed.

To accomplish this composite registering function by the novel use of two pointers registering with the same stationary logarithmic scale of indicia 28, the integrating mechanism of Fig. 3 will be calibrated by so cutting the slots 100 in cylinder 99 that they wind at the proper constant or variable pitch, as they progress axially of cylinder 99. The calibration thus effected is such as to make the increments of backward counterclockwise turning of pointer 26 respectively equal to the logarithmic spacings of antilogarithmic numerals in the scales 15 or 15' in Figs. 4 or 5 responsively to the actual passing of the indicated numbers of gallons of gasoline per hour through carburetor 77. Such calibrating curvature or pitch inclination of slots 100 may be determined by trial and comparison of actual rates of fuel consumption with resulting respective positions of pointer 26 on the scale 28.

Owing to the ability of cylinder slots 100 thus to integrate the simultaneous measuring rotary motion of speedometer spindle 35 and the axial movements of bellows head 62, such motion and movement either singly or jointly will perform automatically an equivalent of the manual computing function of the novelly modified slide rule of Fig. 4, pointer 26 as hereinbefore explained comparing with hair line 17. Thus the desirable result is achieved of registering on the same stationary scale 28, and simultaneously, both the miles-per-hour of vehicle speed and the miles-per-gallon of gasoline consumption.

Fig. 2 further indicates the ability of pointer 26 to move counterclockwise away from alignment with pointer 25 in such cases as when a vehicle is standing still and the engine nevertheless idling or racing and consuming gasoline through carburetor 77. In this instance there will be no working registration of speed by pointer 25, ten miles-per-hour being the minimum marking on scale 28. Therefore, if desired, an auxiliary or additional stationary circular scale of indicia 29 may be added on chart 27 in Fig. 2 so that any counterclockwise departure of pointer 26 from pointer 25, as indicated for instance in Fig. 2, may serve to register on such auxiliary stationary scale a direct reading of the number of gallons per hour rate of gasoline consumption taking place while the car is standing still. In Fig. 5, positions 16a and 17a of the pointers 25 and 26 represent the non-working or idle positions of each pointer wherein as in positions 16' and 17b, pointer 26 may cover and conceal pointer 25.

If it be desired to make the integrating mechanism of these improvements perform the mathematical function of multiplication instead of division the winding slots 100 in cylinder 99 will be pitched in the opposite direction, wherefore in conjunction with clockwise turning of factor indicating pointer 25 in Figs. 2 and 6, accompanied by equal angular movement of product pointer 26, independent factor measuring movement of propelling bridge 66 toward the left in Figs. 1 and 2 will advance product indicating pointer 26 still further clockwise to a product registering position on scale 28.

The appended claims are directed to and intended to be inclusive of all departures from the exact shapes, quantities and relationships of mechanical parts herein particularly described and illustrated as may constitute known substitutes and equivalents therefor falling within the language of the claims.

I claim:

1. A composite instrument for registering automatically and simultaneously on a common stationary scale of indicia both a dividend measurement and the quotient that results from dividing said dividend measurement by a divisor measurement, comprising in combination with a single stationary scale of said indicia, a source of motion commensurate with the dividend measurement, a main indicator of said dividend measurement movably supported to sweep along said scale of indicia, instrumentalities impellingly associating said source of motion with said main indicator in a manner to move the latter to various dividend indicating positions along said scale responsively to said motion, a source of flow-responsive movement separate from said source of motion commensurate with a divisor measurement, a quotient indicator movably supported to sweep along the said scale of indicia, slippage permitting movement transmitting devices impellably associating said quotient indicator with said instrumentalities and means operably relating said movement transmitting devices to said source of flow responsive movement in a manner to cause slippage in said devices whereby said quotient indicator is shiftable by said source of movement to various quotient indicating positions along said scale relatively both to said main indicator and to said scale.

2. An instrument as defined in claim 1, in which the said instrumentalities are constructed and arranged to impel the said dividend indicator in one direction along said scale responsively to progress of the said motion commensurate with increasing dividend values and in which the said means includes a motion reversing element operative to impel the said quotient indicator in the opposite direction along said scale responsively to progress of the said movement commensurate with increasing divisor values.

3. An instrument as defined in claim 1, in which one of the said indicators covers and substantially conceals the other of the said indicators when both indicators are in register with a common indicium on the said common scale.

4. An instrument as defined in claim 1, in which the said two indicators are mounted to travel in different spaced planes parallel with and spaced from said scale of indicia in paths so separated that either of said indicators is free to pass the other indicator while both indicators register simultaneously with said common scale of indicia.

5. An instrument as defined in claim 1, in which the said indicia of the said scale are logarithmically spaced to accord respectively and mathematically with antilogarithmic extents of the said dividend measuring motion and of the said divisor measuring movement.

6. An instrument as defined in claim 1, in which the said source of motion is operably related to the running gear of an automotive vehicle powered by liquid fuel, and the said source of movement comprises apparatus operably responsive to changes in the rate of flow of said liquid fuel.

7. An instrument as defined in claim 1, in which the said devices include a threaded rotatable screw member having a steeply pitched thread, and the said instrumentalities include an actuator arranged to be rotatable in unison with said screw member and also to be slidable in axial relation thereto in camming engagement with said thread thereby to cause rotation of said screw member relative to said actuator.

8. A composite instrument for registering a range of changeable dividend values and simultaneously registering a range of changeable quotient values determined by an unregistered range of changeable divisor values, comprising in combination, a scale of indicia labeled with antilogarithmic numerals denoting in common said range of dividend values and said range of quotient values, said indicia being spaced apart in graduated accordance with the respective logarithms of said numerals, a dividend indicator movable over said scale of indicia, a quotient indicator movable over said scale of indicia, means to move said dividend indicator into register with various indicia denoting a dividend value, separate means movable a variable extent to accord with contemporary divisor values, and mechanism connected to motivate said quotient indicator constructed and arranged cooperatively with both said means to integrate the simultaneous movements thereof.

9. A composite instrument as defined in claim 8, in which the said means to move the said dividend indicator comprises a speedometer, and the said separate means comprises a flow meter.

10. A composite instrument as defined in claim 8, in which the said means to move the said dividend indicator is connected to be responsive to the rate of travel of a motor vehicle, and the said separate means is connected to be independently responsive to the rate of delivery of a liquid fuel to the motor of said vehicle, whereby the said dividend values denoted by the said numerals are miles-per-hour, the said divisor values are gallons-per-hour and the said quotient values denoted by the said numerals are miles-per-gallon.

11. A composite instrument for registering automatically and simultaneously on a common stationary scale of indicia both a speed measurement and the efficiency indicating quotient that results from dividing said speed measurement by a measurement of rate of fuel flow, comprising in combination with a single stationary scale of indicia, a source of speed responsive motion, a speed indicator supported to sweep along said stationary scale, instrumentalities impellingly associated said source of speed responsive motion with said speed indicator in a manner to move the latter to various speed indicating positions along said scale, a source of flow-responsive movement, an efficiency indicator movably supported to sweep along said stationary scale, slippage permitting movement transmitting devices impellably associating said efficiency indicator with said instrumentalities whereby both of said indicators may be moved in unison by said instrumentalities, and means operably relating said movement transmitting devices to said souce of flow-responsive movement in a manner to cause slippage in said movement transmitting devices whereby said efficiency indicator is displaceable in relation to said speed indicator to an extent determined by said source of flow-responsive movement.

12. Composite measurement registering apparatus comprising, a rotary indicator for registering measurement values, functionally separate automatic metering instrumentalities adapted to perform respectively independent motions responsively to changes in relatively distinct conditions to be measured, a member for transmitting movement to said indicator comprising a screw-like cylinder rotatable on its axis and carrying at least one winding cam thread, mechanism for integrating said independent motions of said separate metering instrumentalities including a plurality of elements arranged respectively to share said independent motions of the latter and operative jointly to motivate said indicator, and a driver in operative engagement with said cam thread operably related to both of the said indicator motivating elements.

13. Composite measurement registering apparatus comprising, a rotary indicator for registering measurement values, functionally separate automatic metering instrumentalities adapted to perform respectively independent motions responsively to changes in relatively distinct conditions to be measured, a member for transmitting movement to said indicator comprising a screw-like cylinder rotatable on its axis and carrying at least one winding cam thread, mechanism for integrating said independent motions of said separate metering instrumentalities including a plurality of elements arranged respectively to share said independent motions of the latter and operative jointly to motivate said indicator, and a driver in operative engagement with said thread arranged to be impelled rotatively about said axis by one of said indicator motivating elements and also arranged to be shiftable in axial relation to said cylinder by the other of said indicator motivating elements.

14. Composite measurement registering apparatus comprising, a rotary indicator for registering measurement values, functionally separate automatic metering instrumentalities adapted to perform respectively independent motions responsively to changes in relatively distinct conditions to be measured, a member for transmitting movement to said indicator comprising a hollow cylinder having at least one winding cam slot in the curved wall thereof, and mechanism for integrating said independent motions of said separate metering instrumentalities including a plurality of elements arranged respectively to share said independent motions of the latter and operative jointly to motivate said indicator, the hollow interior of said cylinder being occupied by one of the said indicator motivating elements and the periphery of said cylinder being slidably encompassed by the other of said indicator motivating elements.

15. Composite measurement registering apparatus comprising, a rotary indicator for registering measurement values, functionally separate automatic metering instrumentalities adapted to perform respectively independent motions responsively to changes in relatively distinct conditions to be measured, a member for transmitting movement to said indicator comprising a hollow cylinder having at least one winding cam slot in the curved wall thereof, mechanism for integrating said independent motions of said separate metering instrumentalities including a plurality of elements arranged respectively to share said independent motions of the latter and operative jointly to motivate said indicator, the hollow interior of said cylinder being occupied by one of the said indicator motivating elements and the periphery of said cylinder being slidably encompassed by the other of said indicator motivating elements, and a driver for said hollow cylinder extending crosswise through said winding cam slot and impellably associated with both of said indicator motivating elements.

16. Composite measurement registering apparatus comprising, a rotary indicator for registering measurement values, functionally separate automatic metering instrumentalities adapted to perform respectively independent motions responsively to changes in relatively distinct conditions to be measured, a member for transmitting movement to said indicator comprising a hollow cylinder having at least one winding cam slot in the curved wall thereof, mechanism for integrating said independent motions of said separate metering instrumentalities including a plurality of elements arranged respectively to share said independent motions of the latter and operative jointly to motivate said indicator, one of the said indicator motivating elements having an axially elongated channel and occupying the hollow interior of said cylinder and the other of said indicator motivating elements encompassing the periphery of said cylinder, a rigid stationary hollow post disposed to guide said encompassing indicator motivating element in a straight path, and a driver extending from said encompassing element crosswise through said winding cam slot and slidably engaged with said elongated channel thereby to impart motion from both of said elements to said cylinder.

HENRY G. STRONG.

REFERENCES CITED

The following references are of record in the file of this patent:

UNITED STATES PATENTS

| Number | Name | Date |
| --- | --- | --- |
| 1,401,315 | Clark | Dec. 27, 1921 |
| 1,652,515 | Banning | Dec. 13, 1927 |
| 1,914,946 | Glick | June 20, 1933 |
| 2,116,508 | Colvin | May 10, 1938 |
| 2,250,739 | Ahlstrom | July 29, 1941 |
| 2,324,604 | Svoboda | July 24, 1943 |
| 2,434,694 | Hauptman | Jan. 20, 1948 |

FOREIGN PATENTS

| Number | Country | Date |
| --- | --- | --- |
| 627,729 | France | June 14, 1927 |
| 652,875 | France | Oct. 29, 1928 |